United States Patent
Namiki

(10) Patent No.: US 12,307,819 B2
(45) Date of Patent: May 20, 2025

(54) IDENTIFICATION MODEL GENERATION APPARATUS, IDENTIFICATION APPARATUS, IDENTIFICATION MODEL GENERATION METHOD, IDENTIFICATION METHOD, AND STORAGE MEDIUM

(71) Applicant: CANON KABUSHIKI KAISHA, Tokyo (JP)

(72) Inventor: Kazuhiro Namiki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 17/885,656

(22) Filed: Aug. 11, 2022

(65) Prior Publication Data

US 2023/0064329 A1 Mar. 2, 2023

(30) Foreign Application Priority Data

Aug. 26, 2021 (JP) .................................. 2021-138251

(51) Int. Cl.
| | |
|---|---|
| *G06V 40/18* | (2022.01) |
| *G06V 10/60* | (2022.01) |
| *G06V 10/82* | (2022.01) |
| *G06V 40/19* | (2022.01) |

(52) U.S. Cl.
CPC ............ *G06V 40/197* (2022.01); *G06V 10/60* (2022.01); *G06V 10/82* (2022.01); *G06V 40/19* (2022.01); *G06V 40/193* (2022.01)

(58) Field of Classification Search
CPC ...... G06V 40/197; G06V 10/60; G06V 10/82; G06V 40/19; G06V 40/193
See application file for complete search history.

(56) References Cited

U.S. PATENT DOCUMENTS

| | | | |
|---|---|---|---|
| 10,262,203 B2* | 4/2019 | Sung | H04N 23/56 |
| 10,922,393 B2* | 2/2021 | Spizhevoy | H04L 63/0861 |
| 2017/0193213 A1* | 7/2017 | Tsou | G06F 21/31 |
| 2022/0327189 A1* | 10/2022 | Belli | G06F 21/32 |
| 2022/0405365 A1* | 12/2022 | Yoo | G06F 21/45 |
| 2024/0086512 A1* | 3/2024 | Kim | H04N 23/683 |

FOREIGN PATENT DOCUMENTS

JP 2020-140630 A 9/2020

* cited by examiner

*Primary Examiner* — Sean M Conner
*Assistant Examiner* — Renae A Bitor
(74) *Attorney, Agent, or Firm* — Cowan, Liebowitz & Latman, P.C.

(57) ABSTRACT

An identification model generation apparatus comprises an acquisition unit configured to acquire the image of the eye and data on an image capture status of capturing the image of the eye, an inference unit configured to infer a feature amount of the eye based on the image of the eye and the data on the image capture status, and a learning unit configured to perform learning in the inference unit to approximate the feature amount of the eye obtained from the inference unit to ground truth data that is a ground truth value of the feature amount of the eye corresponding to the image of the eye and the data on the image capture status, and generate the identification model.

17 Claims, 7 Drawing Sheets

F I G. 1
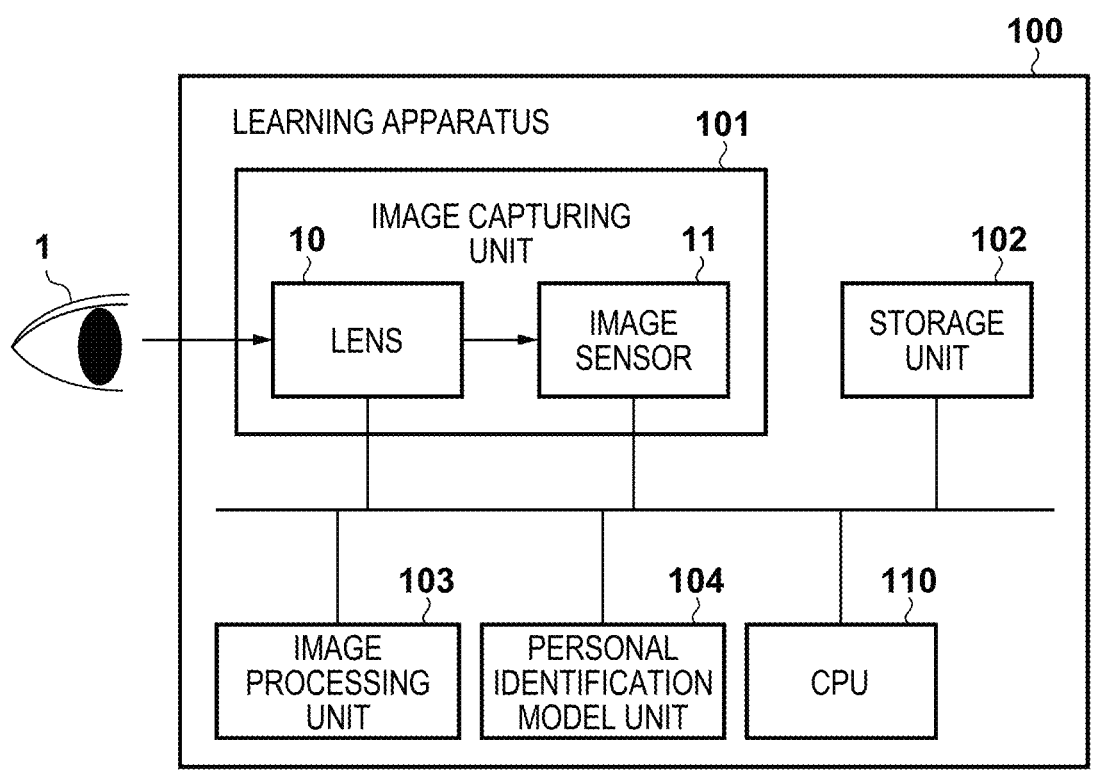

IDENTIFICATION MODEL GENERATION APPARATUS, IDENTIFICATION APPARATUS, IDENTIFICATION MODEL GENERATION METHOD, IDENTIFICATION METHOD, AND STORAGE MEDIUM

BACKGROUND OF THE INVENTION

Field of the Invention

The present invention relates to a technique for identifying a person by using an iris image.

Description of the Related Art

In recent years, a personal authentication technique using an iris image has begun to be used in various applications. For example, the technique is used for personal authentication for managing entrance and exit to and from a facility, and for logging into a PC, a smartphone, a website, and the like.

A personal authentication apparatus implementing such personal authentication identifies and registers a specific user for example, and then performs authentication for logging into a service provided, based on the information thus registered. The personal authentication apparatus is assumed to be mainly used in a room with little outside light.

However, iris recognition has been increasingly performed under outside light in recent years, since a personal identification technique based on iris recognition has begun to be used for equipment often used outdoors such as smartphones. When the iris recognition performed under the outside light including a large amount of near infrared component such as sunlight, near infrared light emitted from the sun or the like and near infrared light reflected from an object illuminated by the sun or the like, reflects in over a wide range of an eye. Thus, the personal authentication may fail when the iris recognition is performed under the outside light, due to mismatch between an iris code registered in advance and an iris code calculated from an eye image captured under the outside light.

Japanese Patent Laid-Open No. 2020-140630 A discloses a technique of performing machine learning using a huge amount of data in which an eye image is associated with a scene image in a direction of view, to be free of the use of calibration processing. The learning requires a huge data set to be used as supervisory data. For example, sight-line recognition is performed using supervisory data obtained by combining an eye image with facial feature point, camera angle, capture program (data obtained in gazing at markers displayed at the top, bottom, left, and right), and the like.

As described above, in Japanese Patent Laid-Open No. 2020-140630 A, to detect the sight-line, the machine learning is performed using the supervisory data obtained by combining data pieces related to a gaze direction such as a scene image in a direction corresponding to the eye image, a camera angle, and the like.

However, when the outside light is incident on the eye, the orientation of the eye is difficult to recognize. Thus, the accuracy of the sight-line recognition is heavily compromised.

SUMMARY OF THE INVENTION

The present invention has been made in view of the above-described problem, and aims to improve accuracy of personal authentication using an iris image even in an environment with outside light.

According to a first aspect of the present invention, there is provided an identification model generation apparatus configured to generate an identification model for identifying a person using an image of an eye, the identification model generation apparatus comprising at least one processor or circuit configured to function as: an acquisition unit configured to acquire the image of the eye and data on an image capture status of capturing the image of the eye, an inference unit configured to infer a feature amount of the eye based on the image of the eye and the data on the image capture status, and a learning unit configured to perform learning in the inference unit to approximate the feature amount of the eye obtained from the inference unit to ground truth data that is a ground truth value of the feature amount of the eye corresponding to the image of the eye and the data on the image capture status, and generate the identification model.

According to a second aspect of the present invention, there is provided an identification apparatus configured to identify a person using an image of an eye, the identification apparatus comprising: an image capturing device configured to capture the image of the eye; and at least one processor or circuit configured to function as: an acquisition unit configured to acquire the image of the eye captured by the image capturing device and data on an image capture status of capturing the image of the eye, an inference unit configured to infer a feature amount of the eye based on the image of the eye and the data on the image capture status, and a comparison unit configured to compare a feature amount of an eye of a specific person registered in advance with the feature amount of the eye inferred by the inference unit.

According to a third aspect of the present invention, there is provided an identification model generation method of generating an identification model for identifying a person using an image of an eye, the method comprising: acquiring the image of the eye and data on an image capture status of capturing the image of the eye; inferring a feature amount of the eye based on the image of the eye and the data on the image capture status; and performing learning in the inferring to approximate the feature amount of the eye obtained by the inferring to ground truth data that is a ground truth value of the feature amount of the eye corresponding to the image of the eye and the data on the image capture status and generating the identification model.

According to a fourth aspect of the present invention, there is provided an identification method of identifying a person using an image of an eye, the method comprising: capturing the image of the eye; acquiring the image of the eye captured by the capturing and data on an image capture status of capturing the image of the eye; inferring a feature amount of the eye based on the image of the eye and the data on the image capture status; and comparing a feature amount of an eye of a specific person registered in advance with the feature amount of the eye inferred by the inferring.

Further features of the present invention will become apparent from the following description of exemplary embodiments with reference to the attached drawings.

BRIEF DESCRIPTION OF THE DRAWINGS

FIG. 1 is a diagram illustrating a configuration of a learning apparatus according to an embodiment of the present invention.

DESCRIPTION OF THE EMBODIMENTS

Figure 2:
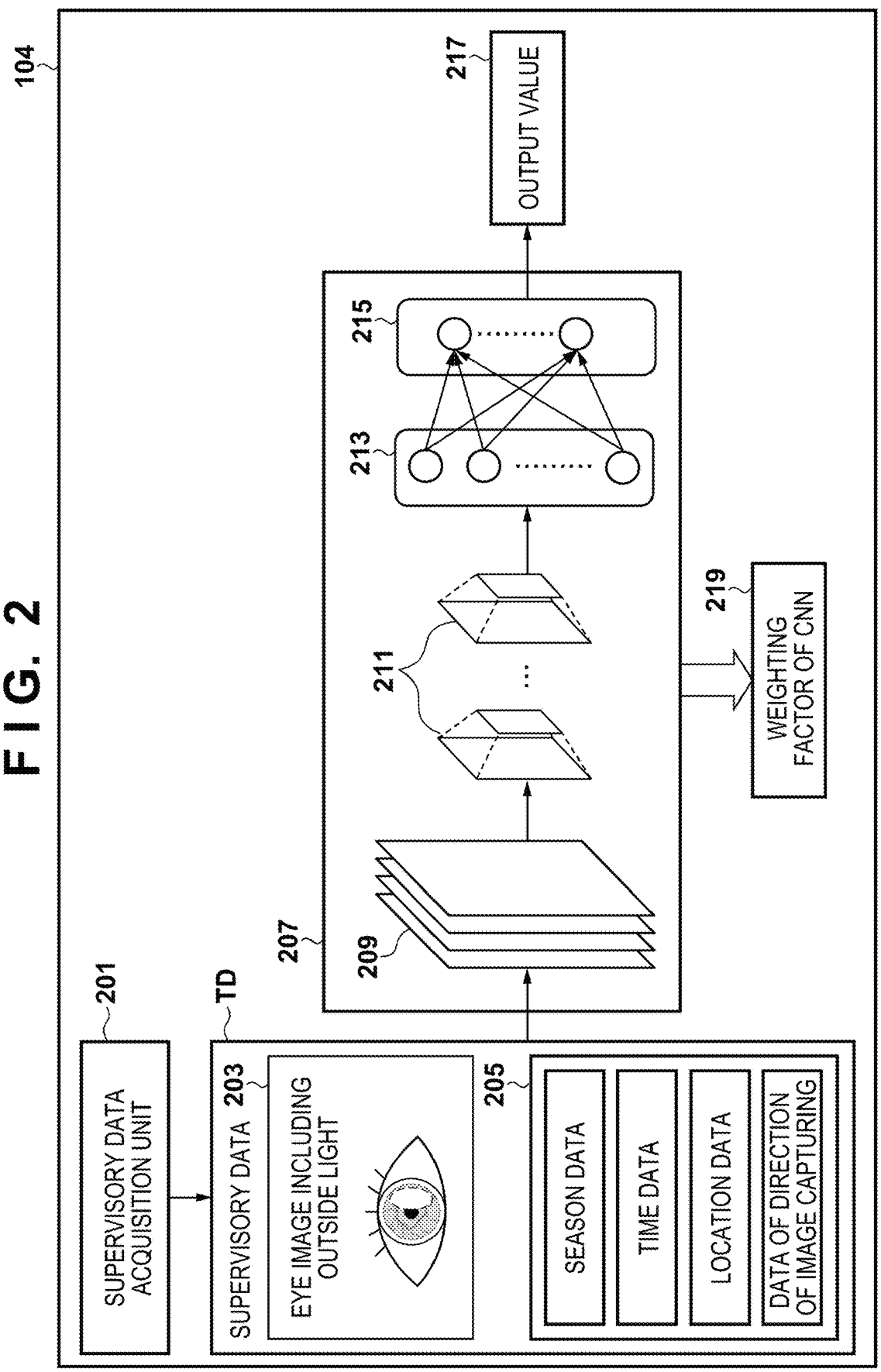
FIG. 2 is a diagram illustrating a software configuration of a personal identification model unit.
Figure 3A:
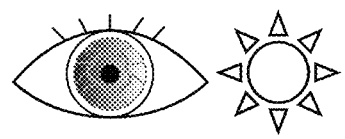
FIG. 3A to FIG. 3D are diagrams illustrating how outside light is incident on an eye.
Figure 3B:
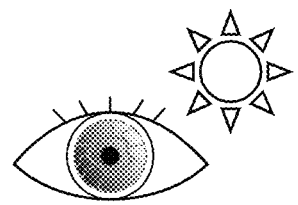
Figure 3C:
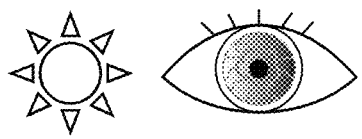
Figure 3D:
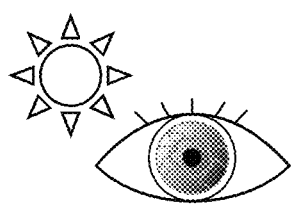

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the description of an embodiment of the present invention, outside light is sunlight, light incident on an eye from a illumination device, or the like. Further, reflection is a luminance pattern in an eye image captured, formed by the outside light.

A personal identification system according to an embodiment of the present invention includes a learning apparatus configured to generate an identification model for identifying a user from an eye image of the user, and calculates a weighting factor for a convolutional neural network (hereinafter, CNN) using the eye image as an input, to perform learning. The personal identification system includes an inference apparatus that identifies a person using the identification model learned with the learning apparatus.

Configuration of Learning Apparatus

FIG. 1 is a diagram illustrating a configuration of a learning apparatus (personal identification model generation apparatus) 100 in a personal identification system of the present embodiment.

The learning apparatus 100 includes an image capturing unit 101, a storage unit 102, an image processing unit 103, a personal identification model unit 104, and a CPU 110.

The image capturing unit 101 includes an eyepiece lens 10 configured to form an eye image of a user 1 looking into the learning apparatus 100. An image based on reflected light from the eye that has passed through the eyepiece lens 10 is formed on an image sensor 11, such as a CMOS type sensor, including photoelectric elements two-dimensionally arranged.

The storage unit 102 stores a machine learning program and also stores an eye image of a person captured by the image capturing unit 101 or an eye image of a person captured using, for example, a digital single lens reflex camera or a mirrorless camera not included in the personal identification system. The machine learning program is a program that calculates a weighting factor for a CNN of the personal identification model unit 104 based on supervisory data processed by the image processing unit 103 and stored in the storage unit 102 to perform the learning, and also updates the weighting factor to generate an inference model featuring high accuracy. The machine learning program performs processing of generating the inference model, upon being executed by the CPU 110. The storage unit 102 further holds status data when the eye image is captured. Examples of such data include image capturing time, image capturing location, a viewing direction of the eye the image of which being captured, a season, and the like.

The image processing unit 103 detects, in an eye image stored in the storage unit 102, the brightness in a region of the eye, which is a luminance value of the image for example, and determines whether the region is an outside light region, by using an outside light evaluation value associating the brightness in the eye image with a position of each brightness. Furthermore, the image processing unit 103 combines an eye image including the outside light and the eye image capturing status data held in the storage unit 102, to generate supervisory data for the learning.

The personal identification model unit 104 is an inference unit formed by the CNN for which a weighting factor is set based on the supervisory data generated by the image processing unit 103 and stored in the storage unit 102. The configuration and the operation flow of the personal identification model unit 104 will be described below in detail.

The image processing unit 103 and the personal identification model unit 104, which are illustrated as individual blocks in FIG. 1, are actually implemented by executing a program stored in the storage unit 102 with the CPU 110.

Configuration of Personal Identification Model Unit 104

Next, the configuration of the personal identification model unit 104 of the learning apparatus 100 will be described with reference to FIG. 2.

A supervisory data acquisition unit 201 acquires, from the storage unit 102, an eye image 203 and image capture status data 205 when the eye image is captured, as supervisory data TD. When the supervisory data TD is input to a CNN 207, the machine learning program held in the storage unit 102 performs learning by calculating weighting factors 219 for the CNN 207, to approximate an output value 217 from the CNN 207 to a ground truth value (ground truth data) of the output value. The personal identification model unit 104 generates an inference model using the weighting factors 219 for the CNN 207 output. Note that the output value 217 output from the CNN 207 in FIG. 2 is a feature amount of an iris image. For the output value (feature amount) corresponding to the supervisory data TD, the ground truth data which is a ground truth value is assumed to be generated in advance through a known method.

As described above, in the present embodiment, the supervisory data TD to be input to the CNN 207 is obtained as a combination of the eye image 203 and the image capture status data 205 when the eye image is captured. For example, data on the season, time, and location in and at which the image is captured, data on the image capturing direction and the like is stored in the storage unit 102 as the image capture status data 205, because incidence of the outside light varies depending on the altitude of the sun. Furthermore, a distribution of the brightness may be obtained in advance for each range of luminance values by acquiring a luminance value for each pixel in the image, and may be combined with data on the location or the direction of the image capturing or the like to improve the accuracy of the supervisory data.

As a method of estimating the incident direction of the outside light from the sun, the brightness of the eye image is determined. As illustrated in FIG. 3A to FIG. 3D, sunlight, as an example of the outside light, incident on the eye brings a higher brightness on the side, of the eye, corresponding to a direction from which the sunlight is incident. Thus, a direction with a higher brightness in a region of the image is determined by acquiring the luminance value for each pixel in the eye image, to estimate the direction of the sun.

By using such information as the supervisory data in combination with the captured eye image including the outside light, outside light characteristics differing among users can be learned with the CNN 207.

As illustrated in FIG. 2, in the present embodiment, the CNN 207 is a personal identification model that is a learning target. The CNN 207 includes, for example, a convolutional layer 209, a pooling layer 211, a fully connected layer 213, and an output layer 215.

The convolutional layer 209 is an example of an input layer, and is a layer in which an image convolution operation is performed. The image convolution corresponds to processing for calculating a correlation with a certain filter. The pooling layer 211 is a layer in which pooling processing is performed. The pooling processing is for setting the maximum value among output values of neurons of the convolutional layer 209 connected, to achieve the invariance of a response with respect to minute changes in the features appearing in the image.

The fully connected layer 213 is a layer in which all the neurons are connected to all the neurons in an adjacent layer. That is, each neuron included in the fully connected layer 213 is connected to all neurons included in an adjacent layer. The fully connected layer 213 is illustrated as one layer in FIG. 2, but may include a plurality of layers. The output layer 215 is a layer disposed at the most output side of the CNN 207. A threshold is set for each neuron, and basically, the output of each neuron is determined depending on whether the sum of the products of each input and each weighting factor exceeds the threshold.

When the supervisory data TD, which is a combination of the eye image 203 including the outside light and the image capture status data 205 when the eye image 203 is captured, is input to the convolutional layer 209 on the most input side of the CNN 207 with this configuration, the output layer 215 outputs an output value (iris feature amount) corresponding to the eye image 203. The machine learning program held in the storage unit 102 updates the weighting factors 219 between each of the neurons to approximate the output value responding to the input of the supervisory data TD, to the ground truth data obtained in advance as described above, and stores the weighting factors 219 in the storage unit 102. The learning is performed in this way.

The personal identification model unit 104 generates the inference model to perform personal identification determination, by using information, obtained by the learning process, indicating the configuration of the CNN 207, the weighting factor between each of the neurons, and the threshold for the neuron.

Description of Flowchart for Learning

Figure 4:
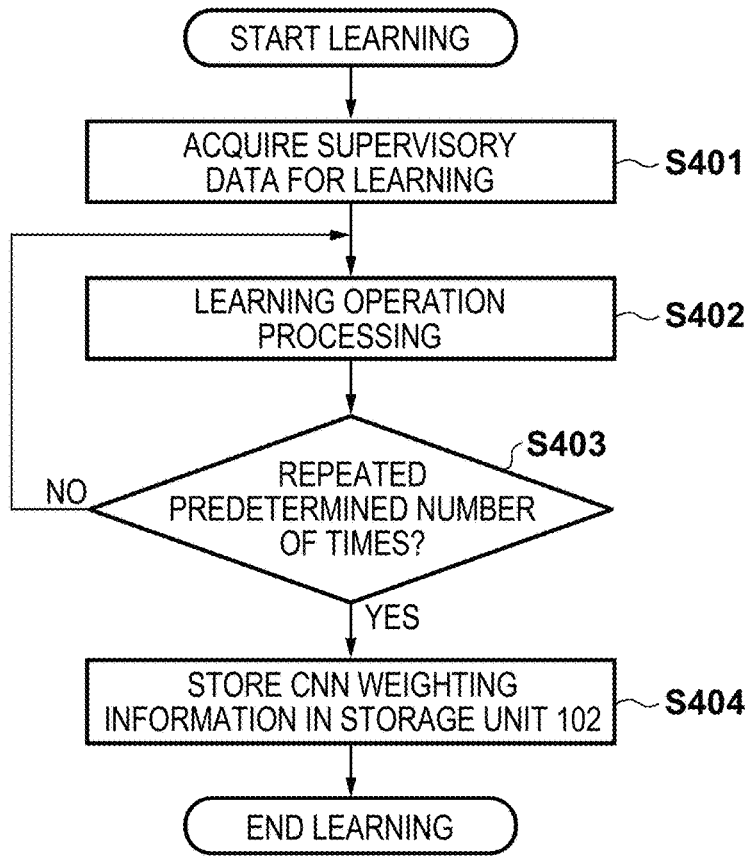
FIG. 4 is a flowchart illustrating a learning operation for an eye image.

FIG. 4 is a flowchart illustrating an example of a procedure of processes of the personal identification model unit 104. An operation of the personal identification model unit 104 will be described with reference to FIG. 4. Note that the procedure of the processes related to the machine learning of the learning apparatus 100 is an example, and each of the processes can be changed as much as possible. Furthermore, a step can be omitted, substituted, and added as appropriate if necessary. The processes in FIG. 4 are implemented by executing a program stored in the storage unit 102 with the CPU 110 of the learning apparatus 100.

In step S401, the supervisory data acquisition unit 201 (CPU 110) acquires the supervisory data TD, for the learning, stored in the storage unit 102.

In step S402, the CPU 110 executes the machine learning of the CNN 207 in the following manner. Specifically, the acquired supervisory data TD is used as the input to the CNN 207 to calculate the weighting factors 219 to approximate the output value 217 from the CNN 207 to the ground truth data.

As a specific example, the CNN 207 is prepared as the learning process target. The configuration of the CNN 207 prepared and the weighting factors 219 between each of the neurons may be acquired using a template or may be input by an operator. Furthermore, in a case where relearning is performed, the personal identification model unit 104 (CPU 110) may prepare the CNN 207 based on the weighting factors 219 for the CNN for which the relearning is performed.

In step S403, the CPU 110 determines whether the machine learning in step S402 has been performed for a predetermined number of times. When the machine learning has been performed for the predetermined number of times, the CPU 110 advances the processing to step S404. Step S402 is repeated when the machine learning has not been performed for the predetermined number of times. The predetermined number of times is adjusted to achieve the maximum learning accuracy and the maximum prediction accuracy, without performing overlearning.

In step S404, the CPU 110 updates the weighting factors 219 serving as information indicating the configuration of the CNN 207 constructed and the threshold for each neuron, and stores the weighting factors 219 in the storage unit 102. After that, the learning process for the CNN 207 ends.

In the present embodiment, as described above, with the learning performed using the supervisory data that is a combination of the eye image including the outside light and the corresponding image capture status data when the eye image is captured, the outside light characteristics due to the season as well as the time, location, and direction of the image capturing can be determined. Thus, the personal identification model can be generated without compromising the accuracy of the personal identification even when the eye image includes reflection of the outside light such as sunlight.

The image capture status data 205 described in the present embodiment may be any data enabling determination of the incidence direction and intensity of the outside light incident on the eye, and thus may be data of a type other than the one described above as long as the data can be used for relative learning of the outside light characteristics in combination with the eye image.

Next, an inference apparatus according to the present embodiment will be described. The inference apparatus, by using the weighting factor of the CNN for each eye image obtained from the personal identification model generated as described above, calculates the feature amount of the eye image of a person, and compares the feature amount with the feature amount of an iris of a person registered to determine whether the person is a specific person.

Configuration of Inference Apparatus

Figure 5:
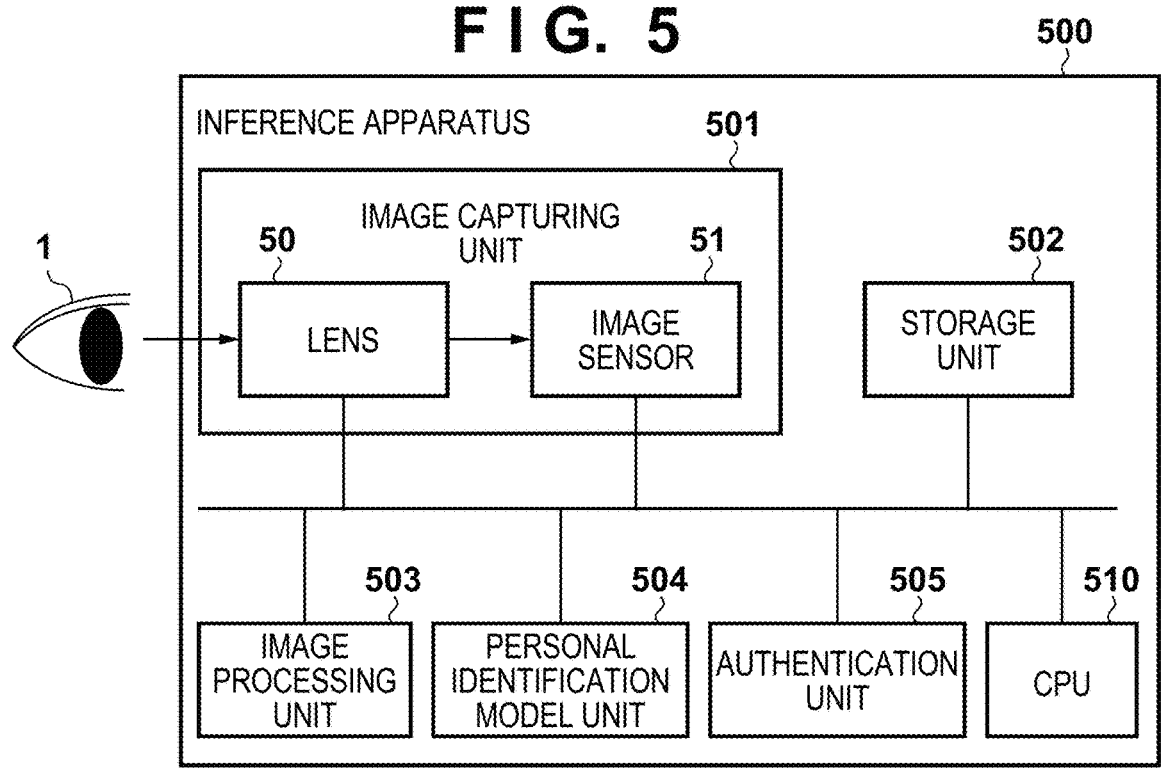
FIG. 5 is a diagram illustrating a configuration of an inference apparatus according to an embodiment of the present invention.

FIG. 5 is a diagram illustrating a configuration of the inference apparatus.

With an inference apparatus 500, personal registration inference is performed to infer a feature amount of an eye image of a person, and the result of the feature amount inference is registered with the inference apparatus 500. Alternatively, personal identification inference is performed to perform personal identification determination by comparing the feature amount of an eye registered with a feature amount of an eye image of a specific person input to the inference apparatus 500.

The inference apparatus 500 includes an image capturing unit 501, a storage unit 502, an image processing unit 503, a personal identification model unit 504, an authentication unit 505, and a CPU 510. The image capturing unit 501, the storage unit 502, and the image processing unit 503 perform similar operations as the image capturing unit 101, the storage unit 102, and the image processing unit 103 in the learning apparatus 100, and thus the description thereof will be omitted.

The image processing unit 503, the personal identification model unit 504, and the authentication unit 505, which are illustrated as individual blocks in FIG. 5, are actually implemented by executing a program stored in the storage unit 502 with the CPU 510.

The personal identification model unit 504, by using the weighting factor of the CNN calculated by the learning apparatus 100 from the supervisory data, which is a combination of an eye image including the outside light and the status data when the eye image is captured, calculates the feature amount of the eye (iris) of a specific person. In the case of the personal registration inference, an inference model is generated by associating an eye image and image capture status data on the eye with a feature amount that is a combination of a feature of an eye of a specific person and a feature of the outside light, and is recorded (registered) in the storage unit 502, as in the case of the learning apparatus 100. In the case of the personal identification inference, first of all, the image capturing unit 501 captures an image of an eye of a person to be identified, a feature amount of the eye of the specific person registered in the storage unit 502 in the personal registration inference is compared with the feature amount of the eye inferred from the eye image of the person to be identified, and the result of the comparison is stored in the storage unit 502.

The authentication unit 505 determines whether the person to be authenticated is a specific person registered in the storage unit 502 based on the identification result (the result of the comparison described above) stored in the storage unit 502 in the personal identification inference, and outputs the result of the authentication. The inference apparatus 500 notifies the person to be authenticated of the authentication result. Examples of the method of the notification include displaying on an unillustrated display provided to the inference apparatus, notification by sound from a speaker, displaying on an external display connected to the inference apparatus through a dedicated cable, notification by sound from an external speaker, and the like.

Configuration of Personal Identification Model Unit 504

Next, a configuration of the personal identification model unit 504 according to the present embodiment will be described with reference to FIG. 6.

An inference image acquisition unit 601 acquires, as input data, an eye image 603 including the outside light, obtained by the image processing unit 503, and image capture status data 605 when the eye image is captured. For the image capture status data 605, data on the season and time in and at which the image is captured is stored in the storage unit 502 for example, because the incidence of the outside light varies depending on the altitude of the sun. With data on the location and direction of the image capturing being stored, the incidence direction of the outside light from the sun can be identified. Thus, such data is combined with the captured eye image including the outside light to obtain the input data.

The personal identification model unit 504 performs the personal registration inference of registering the feature amount of the eye with the inference apparatus, by using the weighting factors 219 of the CNN obtained from the learning apparatus 100 as described above. Alternatively, the registered feature amount is compared with the feature amount of the eye image of a specific person input to the inference apparatus.

Figure 6:
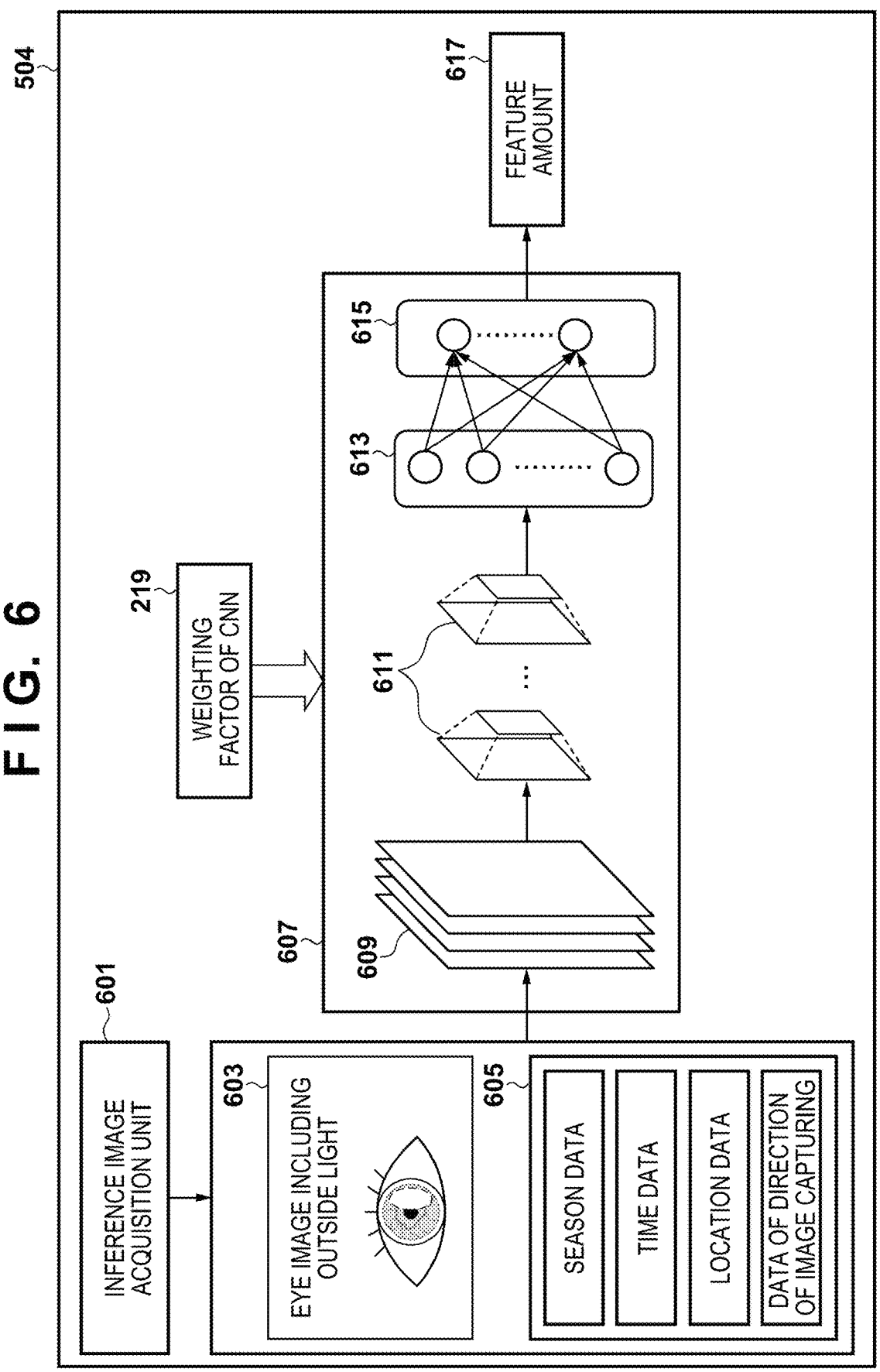
FIG. 6 is a diagram illustrating a software configuration of a personal identification model unit.

In the present embodiment, the inference model that outputs the feature amount of the eye image of the user is a CNN 607 as illustrated in FIG. 6. The CNN 607 includes a convolutional layer 609, a pooling layer 611, a fully connected layer 613, and an output layer 615, and has a configuration similar to that of the CNN 207 of the personal identification model unit 104 of the learning apparatus 100. Further, the layers 609 to 615 are respectively similar to the layers 209 to 215 in the CNN 207 of the personal identification model unit 104 of the learning apparatus 100, and thus description thereof will be omitted.

Description on Flowchart for Personal Registration Inference

Figure 7:
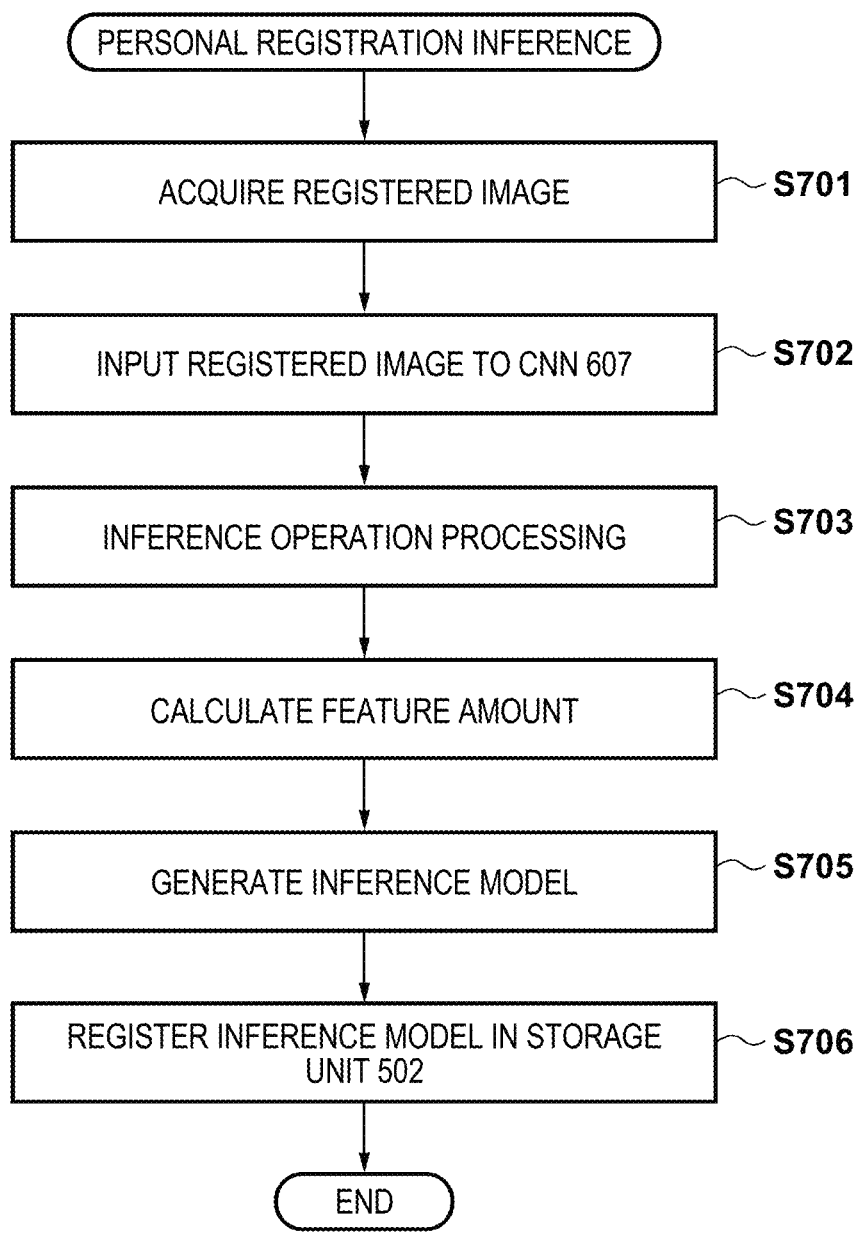
FIG. 7 is a flowchart illustrating processing for personal registration inference for an eye image.

FIG. 7 is a flowchart illustrating a procedure of processing for the personal registration inference of the personal identification model unit 504. The processes in FIG. 7 are implemented by executing a program stored in the storage unit 502 with the CPU 510 of the inference apparatus 500.

In step S701, the CPU 510 acquires, from the storage unit 502, the eye image 603 of the person whose feature amount in the eye image captured by the image capturing unit 501 is to be registered, and the image capture status data 605 when the eye image is captured.

In step S702, the CPU 510 inputs the eye image 603 and the image capture status data 605 when the eye image is captured, acquired in step S701, to the CNN 607.

In step S703, the CPU 510, by using the eye image 603 and the image capture status data 605 when the eye image is captured input in step S702, executes inference operation processing with the CNN 607.

In step S704, the CPU 510 applies the weighting factors 219 of the CNN obtained from the personal identification model unit 104 of the learning apparatus 100 to the CNN 607, and calculates, by using the CNN 607, a feature amount corresponding the eye image of a person whose personal authentication data is to be registered. The result of the personal registration inference is obtained as eye information that is information associating the feature amount of the eye obtained from the CNN 607 with the image capture status data 605 on the eye image, for example.

In step S705, the inference model, in which the eye information obtained in step S704 is aggregated, is generated.

In step S706, the inference model is stored in the storage unit 502 and the personal registration is performed.

As described above, in the case where the personal registration inference is performed, the personal identification model unit 504 infers the eye information from the weighting factors 219 of the CNN obtained in advance from the eye image including the outside light, the eye image 603 including the outside light of a person whose personal registration is to be performed, and the image capture status data 605 when the eye image is captured, and stores the inference model of the person to be registered in the storage unit 502. After that, the personal registration inference processing ends.

Description on Flowchart for Personal Identification Inference

Figure 8:
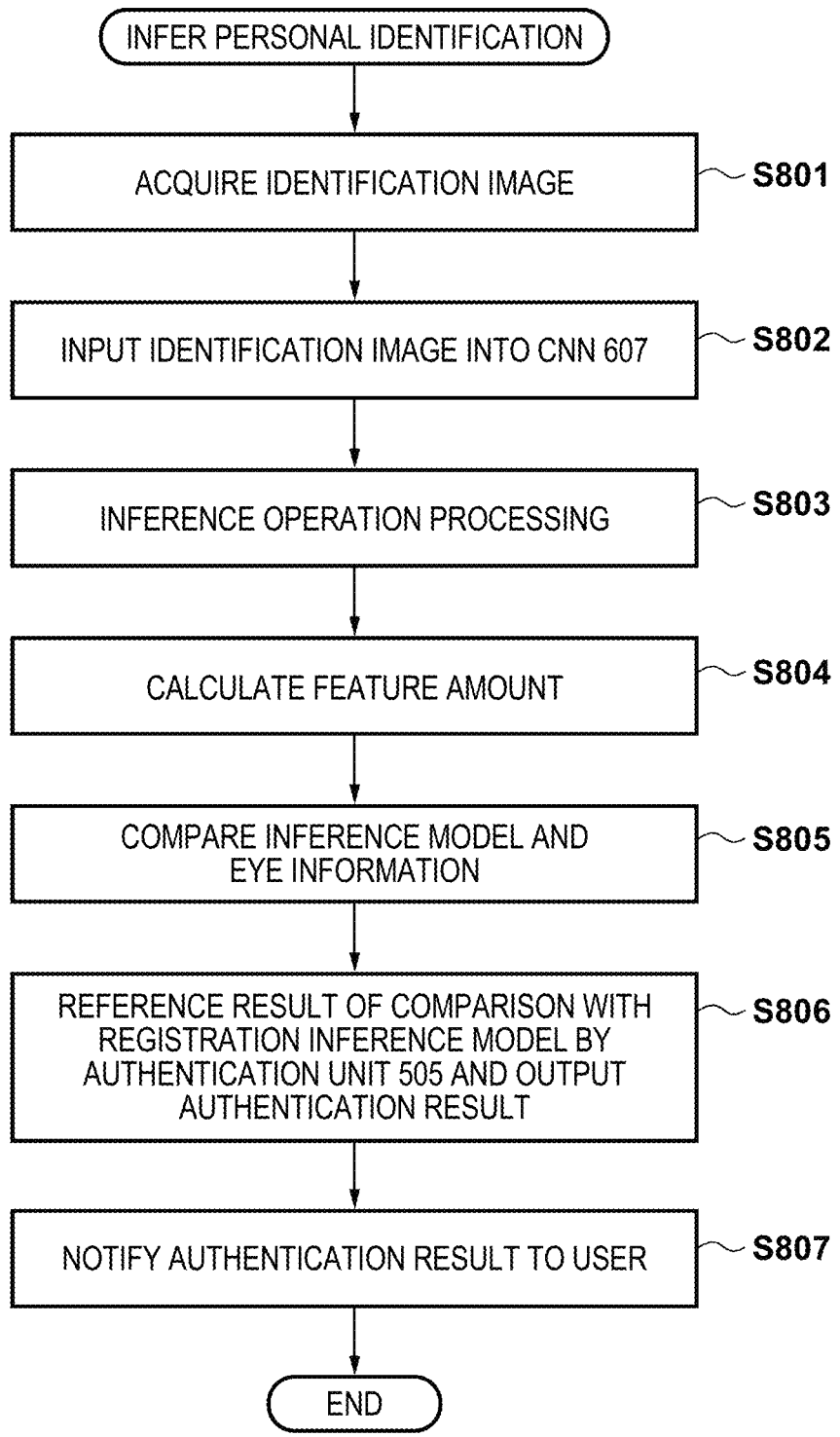
FIG. 8 is a flowchart illustrating processing for personal authentication inference for an eye image.

FIG. 8 is a flowchart illustrating a procedure of processing for the personal identification inference of the personal identification model unit 504. A software configuration for the personal identification inference is similar to the software configuration for the personal registration inference which will be described with reference to FIG. 5 and FIG. 6. The processes in FIG. 8 are implemented by executing a program stored in the storage unit 502 with the CPU 510 of the inference apparatus 500.

In step S801, the CPU 510 acquires the eye image 603, including the outside light and captured by the image capturing unit 501, of the person whose personal authentication is to be performed, and the image capture status data 605 when the eye image is captured.

In step S802, the CPU 510 inputs, to the CNN 607, the eye image 603, including the outside light, of the person whose personal authentication is to be performed and the image capture status data 605 when the eye image is captured, stored in step S801.

In step S803, by using the eye image 603 and the image capture status data 605 when the eye image is captured, input in step S802, the CPU 510 executes calculation processing with the CNN 607.

In step S804, the CPU 510 applies the weighting factors 219 of the CNN obtained from the personal identification model unit 104 of the learning apparatus 100 to the CNN 607, and calculates, by using the CNN 607, a feature amount corresponding the eye image of a person whose personal identification is to be performed. The result of the personal identification inference is obtained as eye information that is information associating the feature amount of the eye obtained from the CNN 607 with the image capture status data 605 on the eye image, for example.

In step S805, the CPU 510 inputs the inference model obtained in step S705, which is the result of the personal registration inference, from the storage unit 502 to the authentication unit 505. Furthermore, the eye information, which is the inference result obtained in step S804, is input to the authentication unit 505. The authentication unit 505 performs personal identification processing by comparing the inference model obtained in step S705 with the eye information obtained in step S804.

In step S806, the authentication unit 505 (CPU 510) determines whether a person whose personal authentication is to be performed is the person registered with the inference apparatus 500 based on the personal identification result obtained in step S805, and outputs the authentication result.

In step S807, the inference apparatus 500 notifies the person whose personal authentication is to be performed, of the authentication result obtained in step S806. Examples of the method of the notification include displaying on an unillustrated display provided to the inference apparatus, notification by sound from a speaker, displaying on an external display connected to the inference apparatus through a dedicated cable, notification by sound from an external speaker, and the like.

As described above, in the case where the personal identification inference is performed, the personal identification model unit 504 compares the inference model registered in the personal registration inference with the eye information obtained at the time of the identification. When the identification result and the inference model match at a certain rate, a person, whose authentication is to be performed, is authenticated as the specific person and notified. After that, the personal authentication inference processing ends.

The image capture status data 605 described in the present embodiment may be any data enabling determination of the incidence direction and intensity of the outside light incident on the eye, and may be data of a type other than that described above as long as the data can be used for relative learning of the outside light characteristics in combination with the eye image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138251, filed Aug. 26, 2021, which is hereby incorporated by reference herein in its entirety.

What is claimed is:

1. An identification model generation apparatus configured to generate an identification model for identifying a person using an image of an eye, the identification model generation apparatus comprising at least one processor or circuit configured to function as:

an acquisition unit configured to acquire the image of the eye and data on an image capture status of capturing the image of the eye, an inference unit configured to infer a feature amount of the eye based on the image of the eye and the data on the image capture status, and a learning unit configured to perform learning in the inference unit to approximate the feature amount of the eye obtained from the inference unit to ground truth data that is a ground truth value of the feature amount of the eye corresponding to the image of the eye and the data on the image capture status, and generate the identification model;

wherein the inference unit is a convolutional neural network configured to infer the feature amount of the eye responsive to an input of a combination of the image of the eye and the data on the image capture status.

2. The identification model generation apparatus according to claim 1, wherein the feature amount of the eye is a feature amount of an iris of the eye.

3. The identification model generation apparatus according to claim 1, wherein the data on the image capture status includes any one of image capturing time, image capturing location, a viewing direction of the eye, and a season.

4. The identification model generation apparatus according to claim 1, wherein the learning unit calculates a weighting factor for the convolutional neural network to approximate the feature amount of the eye obtained from the inference unit to the ground truth data that is the ground truth value of the feature amount of the eye corresponding to the image of the eye and the data on the image capture status, based on the image of the eye and the data on the image capture status.

5. The identification model generation apparatus according to claim 1, wherein the acquisition unit includes an image capturing device configured to capture an image of the eye.

6. The identification model generation apparatus according to claim 1 further comprising a detection device configured to detect brightness of the image of the eye.

7. The identification model generation apparatus according to claim 6, wherein the detection device outputs, as the data on the image capture status, an evaluation value associating the brightness in the image of the eye with a position of each brightness.

8. The identification model generation apparatus according to claim 1, wherein
the identification model generation apparatus further comprises a detection device configured to detect a predetermined characteristic of the image of the eye; and
the detection device outputs, as the data on the image capture status, an evaluation value associating the predetermined characteristic in the image of the eye with a position of each predetermined characteristic.

9. An identification apparatus configured to identify a person using an image of an eye, the identification apparatus comprising:
an image capturing device configured to capture the image of the eye; and
at least one processor or circuit configured to function as:
an acquisition unit configured to acquire the image of the eye captured by the image capturing device and data on an image capture status of capturing the image of the eye,
an inference unit configured to infer a feature amount of the eye based on the image of the eye and the data on the image capture status, and
a comparison unit configured to compare a feature amount of an eye of a specific person registered in advance with the feature amount of the eye inferred by the inference unit;
wherein the inference unit is a convolutional neural network configured to infer the feature amount of the eye responsive to an input of a combination of the image of the eye and the data on the image capture status.

10. The identification apparatus according to claim 9, wherein the feature amount of the eye is a feature amount of an iris of the eye.

11. The identification apparatus according to claim 9, wherein the data on the image capture status includes any one of image capturing time, image capturing location, a viewing direction of the eye, and a season.

12. The identification apparatus according to claim 9 further comprising a detection device configured to detect brightness of the image of the eye.

13. The identification apparatus according to claim 12, wherein the detection device outputs, as the data on the image capture status, an evaluation value associating the brightness in the image of the eye with a position of each brightness.

14. An identification model generation method of generating an identification model for identifying a person using an image of an eye, the method comprising:
acquiring the image of the eye and data on an image capture status of capturing the image of the eye;
inferring a feature amount of the eye based on the image of the eye and the data on the image capture status; and
performing learning in the inferring to approximate the feature amount of the eye obtained by the inferring to ground truth data that is a ground truth value of the feature amount of the eye corresponding to the image of the eye and the data on the image capture status and generating the identification model;
wherein the inferring comprises inferring the feature amount of the eye by a convolutional neural network responsive to an input of a combination of the image of the eye and the data on the image capture status.

15. An identification method of identifying a person using an image of an eye, the method comprising:
capturing the image of the eye;
acquiring the image of the eye captured by the capturing and data on an image capture status of capturing the image of the eye;
inferring a feature amount of the eye based on the image of the eye and the data on the image capture status; and
comparing a feature amount of an eye of a specific person registered in advance with the feature amount of the eye inferred by the inferring;
wherein the inferring comprises inferring the feature amount of the eye by a convolutional neural network responsive to an input of a combination of the image of the eye and the data on the image capture status.

16. A non-transitory computer readable storage medium storing a program causing a computer to function as units of an identification model generation apparatus configured to generate an identification model for identifying a person using an image of an eye, the identification model generation apparatus comprising:
at least one processor or circuit configured to function as:
an acquisition unit configured to acquire the image of the eye and data on an image capture status of capturing the image of the eye,
an inference unit configured to infer a feature amount of the eye based on the image of the eye and the data on the image capture status, and
a learning unit configured to perform learning in the inference unit to approximate the feature amount of the eye obtained from the inference unit to ground truth data that is a ground truth value of the feature amount of the eye corresponding to the image of the eye and the data on the image capture status and generate the identification model;

wherein the inference unit is a convolutional neural network configured to infer the feature amount of the eye responsive to an input of a combination of the image of the eye and the data on the image capture status.

17. A non-transitory computer readable storage medium storing a program causing a computer to function as units of an identification apparatus configured to identify a person using an image of an eye, the identification apparatus comprising:
   an image capturing device configured to capture the image of the eye; and
   at least one processor or circuit configured to function as:
      an acquisition unit configured to acquire the image of the eye captured by the image capturing device and data on an image capture status of capturing the image of the eye,
      an inference unit configured to infer a feature amount of the eye based on the image of the eye and the data on the image capture status, and
      a comparison unit configured to compare a feature amount of an eye of a certain person registered in advance with the feature amount of the eye inferred by the inference unit;
   wherein the inference unit is a convolutional neural network configured to infer the feature amount of the eye responsive to an input of a combination of the image of the eye and the data on the image capture status.

* * * * *